United States Patent [19]
Evans et al.

[11] Patent Number: 5,751,702
[45] Date of Patent: May 12, 1998

[54] NETWORK PROTOCOL FOR WIRELESS BROADBAND ISDN USING ATM

[75] Inventors: Allan Evans, Sunnyvale; Charles Van Blaricom, Cupertino; April Hunter, Altos, all of Calif.

[73] Assignee: Stanford Telecommunications, Inc., Sunnyvale, Calif.

[21] Appl. No.: 568,600

[22] Filed: Dec. 5, 1995

[51] Int. Cl.$^6$ .................................................. H04M 11/00
[52] U.S. Cl. .......................... 370/314; 370/337; 370/346; 370/347; 370/350; 370/508; 379/358
[58] Field of Search ............................ 370/310, 311, 370/313, 314, 328, 329, 330, 336, 337, 343, 344, 345, 346, 347, 348, 349, 350, 507, 508, 522; 455/33.1, 54.1, 54.2, 56.1; 375/261, 298, 358; 379/58, 59, 63; 371/37.1, 43

[56] References Cited

U.S. PATENT DOCUMENTS

| | | | |
|---|---|---|---|
| 5,084,891 | 1/1992 | Ariyavisitakul et al. | 371/42 |
| 5,333,175 | 7/1994 | Ariyavisitakul et al. | 379/58 |
| 5,426,641 | 6/1995 | Afrashteh et al. | 370/95.3 |
| 5,475,677 | 12/1995 | Arnold et al. | 370/29 |
| 5,568,482 | 10/1996 | Li et al. | 370/79 |

FOREIGN PATENT DOCUMENTS

60-248039   4/1986   Japan ................. H04J 3/16

Primary Examiner—Douglas W. Olms
Assistant Examiner—Ricky Q. Ngu
Attorney, Agent, or Firm—Jim Zegeer, Esq.

[57] ABSTRACT

A networking protocol for wireless point (base station) to multipoint (user) networks where the users are stationary which utilized time-division multiplexing the in the direction of the base station to the user, heretofore called the downstream direction, and time-division multiple access in the direction of the user to the base station, heretofore called the upstream direction, where medium access control actively assigns time slots in the upstream direction to accommodate varying demands for bandwidth by multiple users, where upstream frame timing is synchronized to the downstream frame timing, where time slots carry individual ATM cells, where the first time slot of the downstream frame carries a frame start ATM cell, where upstream time slot synchronization is maintained to within ±2 modulation symbols through timing control from the base station to the user, where random access time slots are used for control plane requests by users entering the network and users in standby mode seeking to begin a session, where polling is used for management plane functions and responses by users are on a polling response time slot.

14 Claims, 3 Drawing Sheets

NETWORK PROTOCOL FOR WIRELESS BROADBAND ISDN USING ATM

BACKGROUND OF THE INVENTION

The recent allocation of frequencies by the FCC at 2.5 GHz and 28 GHz has enabled the delivery of broadband-ISDN services to residential and commercial users through wireless means. Broadband ISDN typically uses ATM as the link layer of the network protocol. ATM is a switch-oriented link protocol where each user has a dedicated connection to the switch and the switch manages bandwidth contention by multiple users by queues input cells until they can be delivered to the appropriate output. In a wireless point to multipoint system, the analog of the switch resides in a base station, and the link to the switch is a shared medium by all users whose access to that medium must be controlled. Therefore, for wireless point to multipoint systems there is the additional need for medium access control which is not required in ordinary ATM networks.

The medium access control requirements for wireless point to multipoint systems where the users are stationary are unique compared to other wireless networks such as wireless local area networks (LANs) as specified by the IEEE 802.11 standard. A wireless point to multipoint system can take advantage of the stationary nature of users enabling the use of highly directional antennas at the user stations. However, the base station will still employ broad beam antennas and will thus have multiple user transmissions received simultaneously. Medium access control will be necessary to ensure that mutual interference by multiple user transmission impinging on the base station antenna is eliminated.

There are numerous MAC protocols currently in use by both wired and wireless standards. In Ethernet, where the cabling is a shared medium, carrier-sense multiple access is employed, which is essentially a listen before talk approach. In wireless LANs, such as that specified by the IEEE 802.11 standard, medium access control is also managed through carrier-sense multiple access. This is possible because portable user terminal will each typically have an omnidirectional antenna so that each user terminal can receive transmissions from other users and ascertain whether the frequency channel is available. This is not possible with wireless point to multipoint systems where stationary users employ directional antennas, as they cannot receive transmissions from other users.

An additional complication in wide area wireless point to multipoint systems, is that the two way range differential between users close to the base station and those distant to the base station can be much larger than a modulation symbol.

The object of this invention is a networking protocol which provides bandwidth to users on an on-demand basis, which controls access by users to the shared wireless medium, which is bandwidth efficient, and which can be implemented with the minimum of hardware cost.

DESCRIPTION

Summary of the Invention

A networking protocol for wireless point (base station) to multipoint (user) networks where the users are stationary which utilized time-division multiplexing in the direction of the base station to the user, heretofore called the downstream direction, and time-division multiple access in the direction of the user to the base station, heretofore called the upstream direction, where medium access control actively assigns time slots in the upstream direction to accommodate varying demands for bandwidth by multiple users, where upstream frame timing is synchronized to the downstream frame timing, where time slots carry individual ATM cells, where the first time slot of the downstream frame carries a frame start ATM cell, where upstream time slot synchronization is maintained to within ±2 modulation symbols through timing control from the base station to the user, where random access time slots are used for control plane requests by users entering the network and users in standby mode seeking to begin a session, where polling is used for management plane functions and responses by users are on a polling response time slot.

Features of the Invention

A networking protocol for wireless point (base station) to multiport (user) networks with stationary users utilizing high gain directional antennas where:

1. Means for transmission convergence layer is provided through
   a) Time-division multiplexing is utilized in the direction of the base station to the user, heretofore called the downstream direction;
   b) Time-division multiple access is used in the direction of the user to the base station, heretofore called the upstream direction;
   c) Time slots in the upstream direction have two preamble bytes, one ATM cell, and a one byte guard band;
   d) Time slots in the downstream direction have one sync byte, one ATM cell, and no guard band;
   e) Upstream frame timing is synchronized to the downstream frame timing, where the first time slot of the downstream frame carries a frame start ATM cell which is defined by a unique reserved VPI/VCI;
   f) Frame periods in both the upstream and downstream directions are approximately but not greater than six milliseconds in length to allow delivery of voice traffic with minimum latency.

2. Means for physical medium dependent layer where:
   a) The downstream in continuous-carrier, without pulse-shape filtering, with frequency channels symbol synchronous and spaced 1 TD apart where TD is the period of a downstream modulation symbol;
   b) The upstream is burst-mode with 25% excess bandwidth root raised cosine filtered with frequency channels spaced 1.25/TU apart where TU is the period of an upstream modulation symbol;
   c) QPSK or alternately 16 QAM modulation is employed on the upstream and the downstream;
   d) A concatenated (60, 54) Reed-Solomon over GF(256) and rate 7/8 convolutional code is used on the downstream; and
   e) A (59,53) Reed-Solomon code over GF(256) is used on the upstream.

3. Means for control plane functions is provided through:
   a) In-band signaling through ATM cells with reserved VPI/VCIs so that the requirements for acquisition, demodulation, and forward error correction are uniform across the data, control, and management planes of the network protocol;
   b) Transmission convergence layer medium access control which actively assigns time slots in the upstream direction to accommodate varying demands for bandwidth by multiple users;

c) Continuous time slots at the beginning of the upstream frame are used for entry into the network by users whose two-way range timing has not been resolved to avoid mutual interference, where users entering the network remain on the net entry time slots until their timing is aligned by means described in claim 1;

d) Session requests are performed on a contention basis through random access of the net entry time slots;

e) Carrying control plane acknowledgment of service requests in the payload of the frame start ATM cell in downstream frame.

4. Means for management plane functions are provided through:

a) In-band signaling through ATM cells with reserved VPI/VCIs so that the requirements for acquisition, demodulation, and forward error correction are uniform across the data, control, and management planes of the network protocol;

b) Polling users by the base station, with users responding on dedicated time slots in the upstream frame;

c) Carrying management plane polling requests in the payload of the frame start ATM cell in the downstream frame carries;

d) Upstream time slot synchronization is maintained to within ±2 modulation symbols through timing control from the base station to the user and through slaving the user transmit symbol clock to its received symbol clock in the transmission convergence layer;

e) Upstream power control is employed to ensure adequate received signal strength at the base station while minimizing adjacent cell interference.

5. Hardware and software means for implementing above claims in the base station including:

a) means for routing of in-band signaling ATM cells by the ATM switching device to and from the central processing unit;

b) means for measuring timing offsets by subscribers through counting periods of the reference symbol clock from a master frame epoch to the detection of the Barker sequence of the received transmission from the user;

c) means for measuring received signal level via bit error rate estimation for closed loop power control of the user transmitter.

6. Hardware and software means for implementing above claims in the user equipment including:

a) means for routing in-band signaling ATM cells to and from the ATM switching or segmentation and reassembly device to the user equipment central processing unit;

b) adjusting transmitter power based on received power level and power control commands via in-band signaling ATM cells from the base station;

c) means for slaving the transmit symbol clock reference to the received symbol clock reference;

d) means for adjusting the transmit symbol clock timing to minimize interference to other users.

DESCRIPTION OF THE DRAWINGS

The above and other objects, advantages and features of the invention will become more clear when considered with the following specification and attached drawings, wherein.

DETAILED DESCRIPTION OF THE INVENTION

It is well known that asynchronous transfer mode is the candidate network link protocol for broadband integrated services digital network (B-ISDN) which is typically defined as bit rates in excess of that of the primary rate interface ISDN (PRI-ISDN) of 1.544 Mbps. Physical layer standards have been developed or are being developed for using ATM over synchronous optical network (SONET) at rates of 155 and 622 Mbps, over category 3 twisted pair at 25 Mbps, and over category 5 twisted pair at 45 Mbps and 100 Mbps. In each of these cases, however, the network topology is switch-oriented where each user has a dedicated connection to an input port of the switch, and the switch buffers input cells until they can be routed to an output port of the switch. This is a classical star configuration.

In a wireless point to multipoint system, where the users each employ a norrowbeam antenna, and the switch resides in a centrally-located base station which employs a broad beam antenna, in which multiple users lie in its beam, the wireless medium becomes a shared medium. While the point to multipoint nature of the system appears to be a star topology, because the wireless medium is shared, it is actually a bus or ring configuration. Hence, a medium access control protocol needs to be defined.

Figure 1:
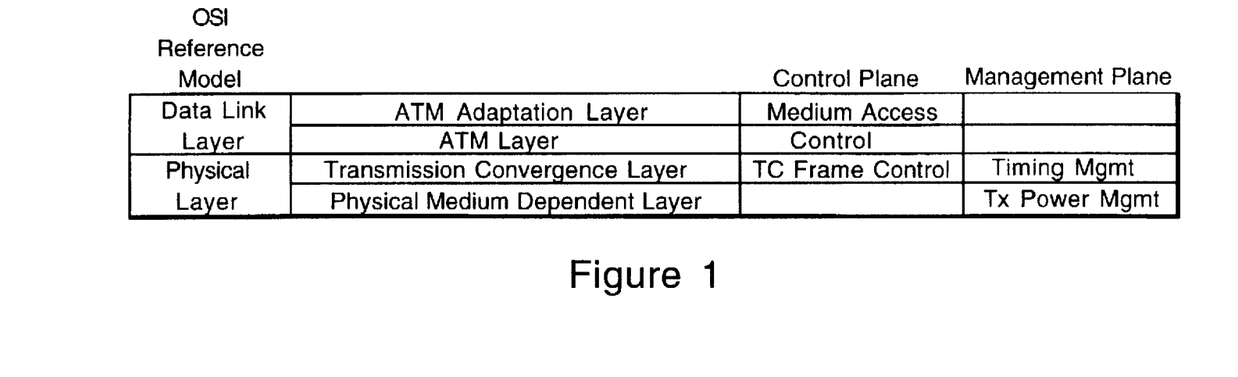
FIG. 1 shows the protocol stack for the invention according to the convention of the OSI Reference Model.
Figure 2:
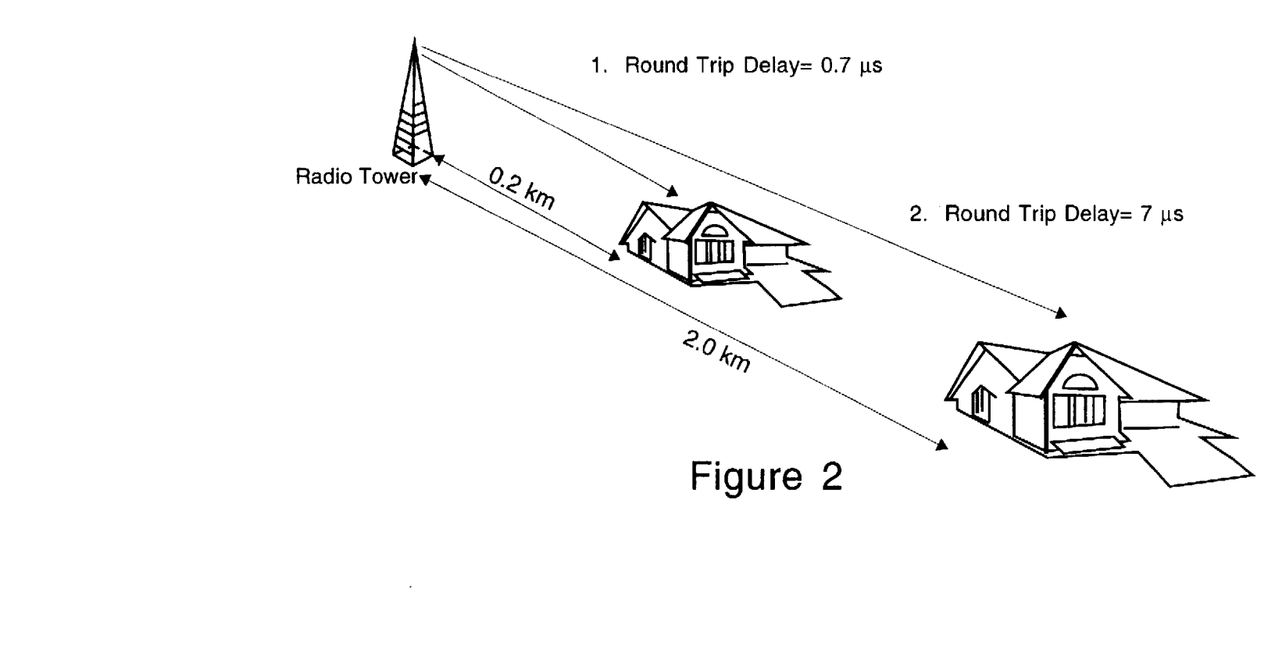
FIG. 2 illustrates the two way turnaround effect of range from the base station which causes the need for large guard bands between user transmissions, 1 being the nearby user and 2 being the distant user.

The network protocol stack is as shown in FIG. 1, and comprises the physical layer of the OSI Reference Model. Within the physical layer there is the physical medium dependent layer which involves the modulation, forward error correction, and filtering of the signal that is transmitted over the wireless medium. The transmission convergence layer comprises time-multiple access, the frame structure, and the time slot structure within each frame.

The control plane functions at the transmission convergence layer include those functions necessary for controlling access to the wireless medium through assignment of time slots. This function must interface to a higher level control plane functions such as the ITU Q.2931 signaling standard, the ATM Forum User Network Interface, and LAN Emulation clients.

The management plane functions at the transmission convergence layer involve timing control to minimize guard band times between time slots. At the physical layer, the management functions involve controlling the user transmitter power to ensure an adequate received signal level at the base station but not too strong as to cause adjacent cell interference, where cell refers to a cell in a cellular distribution system, not an ATM cell. Additionally, the management plane functions include controlling the user's transmit frequency so that is does not interfere with users on adjacent frequency channels, which is described in detail in a separate patent application.

NETWORK PROTOCOL STACK

Transmission Convergence Layer

Downstream

Since the downstream data originates from the same source and is continuous carrier, different ATM virtual circuits are time-division multiplexed onto a single RF carrier. The format is shown in Table 1. The Sync Byte is used to synchronize the deinterleaver and the Reed-Solomon decoder in the user demodulator.

TABLE 1

| Downstream Time Slot Structure | | | | | | | | | |
|---|---|---|---|---|---|---|---|---|---|
| 1 | 2 | 3 | ... 54 | 55 | 56 | 57 | 58 | 59 | 60 |
| Sync Byte | | ATM Cell | | Check Byte 1 | Check Byte 2 | Check Byte 3 | Check Byte 4 | Check Byte 5 | Check Byte 6 |

3.4.1.1.2 UPSTREAM

Since the upstream data originates from different sources, each with different symbol timing and center frequency offsets, the upstream with be time-division multiple access. The format is shown in Table 2.

TABLE 2

| Frame Start Cell Payload | | | | | | | |
|---|---|---|---|---|---|---|---|
| 1 ... N | N+1 ... M | M+1 | ... | P | P+1 ... 48 | | |
| Contention Availiability/ Acknow- ledgment | Subscriber IDs for Polling | Subscriber Timing, Frequency, and Power Adjustments | | | Reserved | | |

The start of the downstream frame is delineated by a Frame Start ATM cell in the first time slot. This Frame Start ATM cell carries a reserved VPI/VCI header which can be routed by the segmentation and reaasembly ASIC to the host processor in the user equipment. This will reset the upstream frame time slot count in the user processor, enabling the upstream frame timing to be synchronized to the downstream frame timing.

The payload of the frame start cell will contain fields for resolving ambiguity

TABLE 3

| Downstream Frame Structure | | | | | | | | | |
|---|---|---|---|---|---|---|---|---|---|
| Frame Start | Time Slot 1 | Time Slot 2 | Time Slot 3 | Time Slot 4 | Time Slot 5 | ... | Time Slot N-2 | Time Slot N-1 | Time Slot N |

TABLE 4

| Frame Start Cell Payload | | | | | | |
|---|---|---|---|---|---|---|
| 1 ... N | N+1 ... M | M+1 ... P | | | P+1 ... 48 | |
| Contention Availiability/ Acknow- ledgment | Subscriber IDs for Polling | Subscriber Timing, Frequency, and Power Adjustments | | | Reserved | |

The upstream frame structure is shown in Table 5. There will be contiguous time slots at the beginning of the frame for random access by users attempting to either enter the network during a power up, or by users attempting to switch to an active state from an inactive state, or by users needing control signaling during an active state.

TABLE 5

| Upstream Frame Structure | | | | | | | | |
|---|---|---|---|---|---|---|---|---|
| Random Access 1 | Random Access 2 | .. | Random Access N | Polling Response 1 | .. | Polling Response M | Time Slot 1 | ... Time Slot M |

Physical Medium Dependent Layer

Downstream

The modulation parameters are shown in Table 6.

Since all frequency channels in the downstream direction originate from the same source, the downstream can be continuous carrier with each frequency channel symbol synchronous. By maintaining the data on each frequency channel to be symbol synchronous, it enables the frequency channels to be spaced $1/T_D$ apart where $T_D$ is the period of a downstream modulation symbol. This obviates the need for spectral-shape filtering on each frequency channel to reduce its spectral occupancy.

TABLE 6

| Downstream Modulation Parameters | |
|---|---|
| Parameter | Value |
| Pulse-Shape Filtering | None |
| Modulation | π/4 QPSK |
| Convolutional Encoding | Rate ⅞ |
| Interleaving | Forney Method, Depth = 12 |
| Reed-Solomon Encoding | (60,54) |

TABLE 7

| Typical Downstream Data Rate | |
|---|---|
| QPSK Modulation Symbol Rate | 34.000 Mbaud |
| Coded Symbol Rate | 68.000 Msps |
| Convolutional Coded Symbol Rate | 61.200 Msps |
| Bit Rate | 53.550 Mbps |
| ATM Rate | 52.558 Mbps |
| ATM Cell Rate | 0.124 M Cells/Sec |
| ATM Cells per Frame | 743.000 |
| Frame Period | 5.994 ms |

Upstream

The modulation parameters are shown in Table 8.

TABLE 8

| Upstream Modulation Parameters | |
|---|---|
| Parameter | Value |
| Pulse-Shape Filtering | α = 0.25 Root-Raised Cosine |
| Modulation | π/4 QPSK |
| Convolutional Encoding | None |
| Interleaving | None |
| Reed-Solomon Encoding | (59,53) |

TABLE 9

| Typical Upstream Data Rate | |
|---|---|
| QPSK Modulation Symbol Rate | 2.607 Mbaud |
| Time Slot Symbol Rate | 5.213 Msps |
| Coded Symbol Rate | 4.961 Mbps |

TABLE 9-continued

| Typical Upstream Data Rate | |
|---|---|
| ATM Rate | 4.456 Mbps |
| ATM Cell Rate | 0.011 M Cells/Sec |
| ATM Cells per Frame | 63.000 |
| Frame Period | 5.994 ms |

MANAGEMENT PLANE

Net Entry

Upon power up, the user will acquire the downstream frame timing and begin processing the Contention Availability Acknowledgment field of the Frame Start cell payload. When the contention time slots are available, a null user ID will be contained in the field. The user will then transmit a single Net Entry ATM cell on the Contention time slot in the next upstream frame. A Net entry ATM cell will be defined by a reserved VPI/VCI in the cell header, plus additional information in the payload containing the user ID. If the Net Entry ATM cell is successfully received by the base station, the base station will acknowledge by responding with the user's ID in the Contention Availability/ Acknowledge field of the frame start cell in the next frame. The field will also contain timing, frequency, and power adjustments.

The user will continue to transmit Net Entry ATM cells on the Contention time slots until its timing, frequency, and power are within prescribed limits at which time it will be commanded to a standby state freeing up the Contention time slots for another user.

In the case of a collision on the Contention time slots, the base station will not acknowledge any user and the Frame Start cell will continue to indicate that the Contention time slots are available by containing the null user ID. The users will then perform any number of well known algorithms, such as randomly back off based on the user ID, to determine how many frames they wait before retransmission.

Network Management

During operation, inactive users will have to be periodically polled to ensure that their time slot timing, transmit frequency, and transmit power are suitable to maintain reliable communication. This is necessary as the propagation characteristics will change over time; for instance if is begins to rain. With approximately 250 users per coverage area, polling one user per frame, each user would be polled every 1.5 seconds. The number of users polled per frame will depend on user density, coverage area, and data rates employed when the system is deployed.

The polling sequence is described. In the Frame Start cell, user IDs are placed in the Polling field. During the next frame, these polled subscribers respond on the Polling Response time slots. The base station computes the correction factors for timing, frequency, and power control and sends them in the Subscriber Adjustment field of the Frame Start cell in the next frame.

If a user fails to respond to a poll, the Subscriber Adjustment field will be null for that user. The base station will then wait until the next cycle, after it polls all other users, before polling the user again, so that other users are polled at the regular interval. After a certain number of polls where the user fails to respond, the network manager will consider that user in a power down state. That user will have perform Net entry to return to the standby state.

CONTROL PLANE

When a user in the standby state wishes to begin a session, it will transmit a Session Request ATM cell on the Contention time slots when available. Again the Session Request ATM cell will have a reserved VPI/VCI in the cell header with the cell payload containing the type of request and the user ID. The Transmission Convergence Call Processing agent in the base station will then interface with the necessary higher level control plane functions to complete the session initialization.

Depending on the level of interaction required to initiate the session, the user may only have to send the single Session Request cell, or the user may have to be assigned a traffic time slot to complete the signaling functions.

HARDWARE AND SOFTWARE IMPLEMENTATIONS

User Equipment

Figure 3:
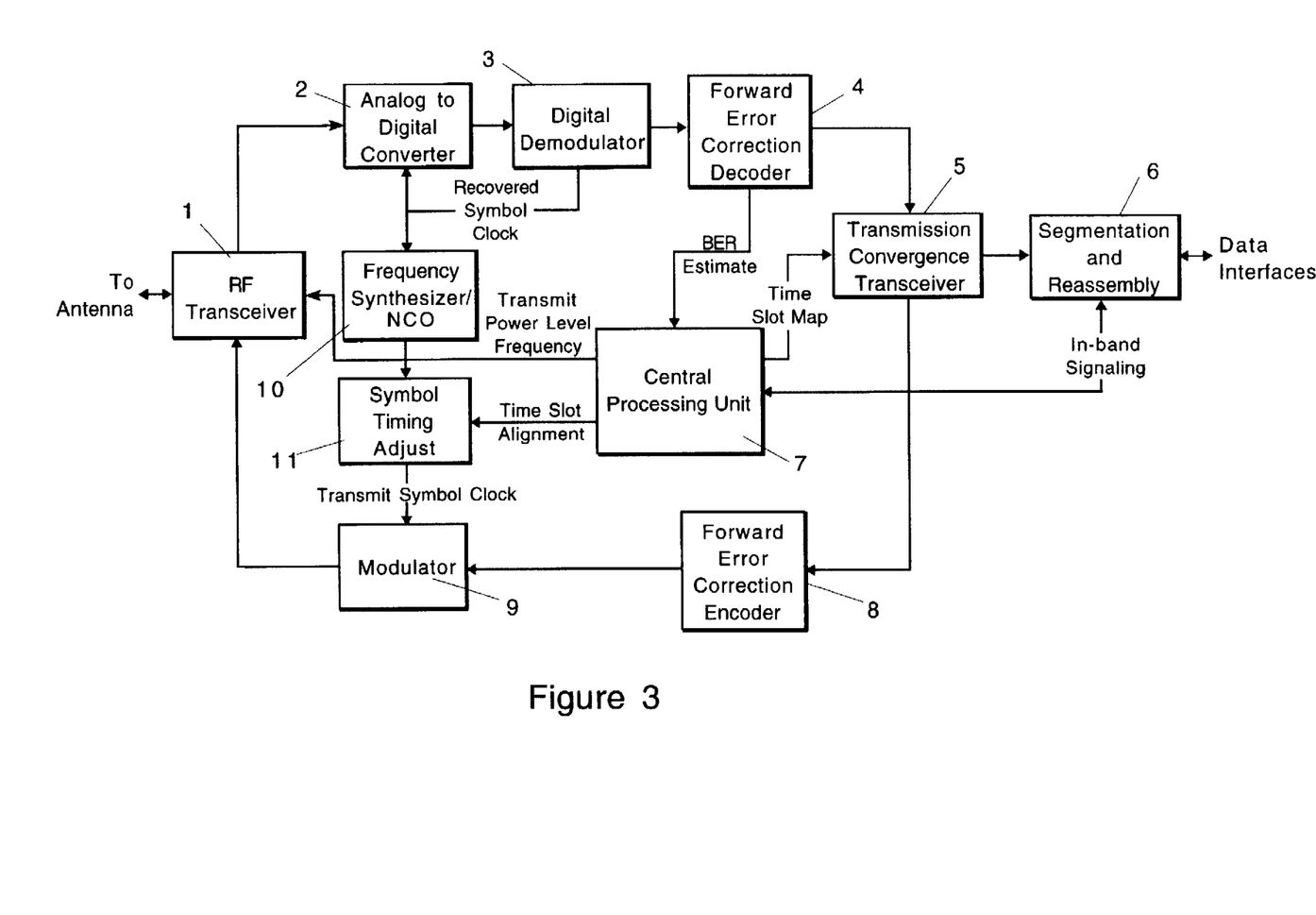
FIG. 3 is a block diagram of user or subscriber station hardware architecture.

FIG. 3 shows the block diagram for the subscriber equipment which implements the wireless network protocol. An RF transceiver (1) interfaces with the antenna and performs signal amplification, downconversion from RF to baseband, and the gain control to provide proper levels into the analog to digital (A/D) converter (2). The digital demodulator (3) recovers the carrier and symbol timing of input signal and passes soft-decision demodulation data to the forward error correction decoder (4), the digital demodulator recovers the input signal symbol timing by controlling the phase of the A/D converter sample clock via a data transition tracking loop fed back to a voltage-controlled oscillator (not shown for clarity). The digital demodulator also controls the gain in the downconverter stage of the RF transceiver via a gain control voltage. The forward error correction decoder performs convolutional decoding via the Viterbi algorithm and Reed-Solomon decoding and passes recovered ATM cells to the transmission convergence transceiver (5). The transmission convergence transceiver detects the frame start ATM cell and counts time slots within the frame to filter out ATM cells which are not intended for the user. ATM cells intended for the user are passed to the segmentation and reassembly (SAR) device (6) which constructs higher level packets to be passed to the date interfaces. In-band ATM signaling cells are passed directly to the central processing unit (7) which interprets the commands.

In the transmit direction, the central processing unit maintains a time slot map which is loaded into the transmission convergence transceiver. As higher level packets from the data interfaces are segmented into ATM cells, the transmission convergence transceiver loads them into the prescribed time slots of the upstream frame. In-band signaling cells, either session requests or responses to polling are passed from the central processing unit to the segmentation and reassembly device for insertion into the upstream frame.

Alternately, the transmission convergence transceiver can recognize and direct in-band signaling ATM cells to and from the central processing unit and bypass the SAR device, or the transmission convergence transceiver and the SAR may be combined into a single device.

ATM cells packaged onto the upstream frame are passed to the forward error correction encoder (8) which then sends the serial stream to the modulator (9) for modulation onto a carrier. The symbol timing of the modulator is coherently referenced to the recovered receive symbol timing via a frequency synthesizer or numerically controlled oscillator (NCO) (10). The symbol timing can be adjusted to ensure time slot alignment by a clock swallower circuit (11) or other means. The modulated signal is then frequently converted to the desired RF frequency by the RF transceiver. The output power level is controlled by the CPU form measurements of received power level from the AGC feedback from the digital demodulator to the RF transceiver and from the bit error rate estimator in the forward error correction device.

Base Station Equipment

Figure 4:
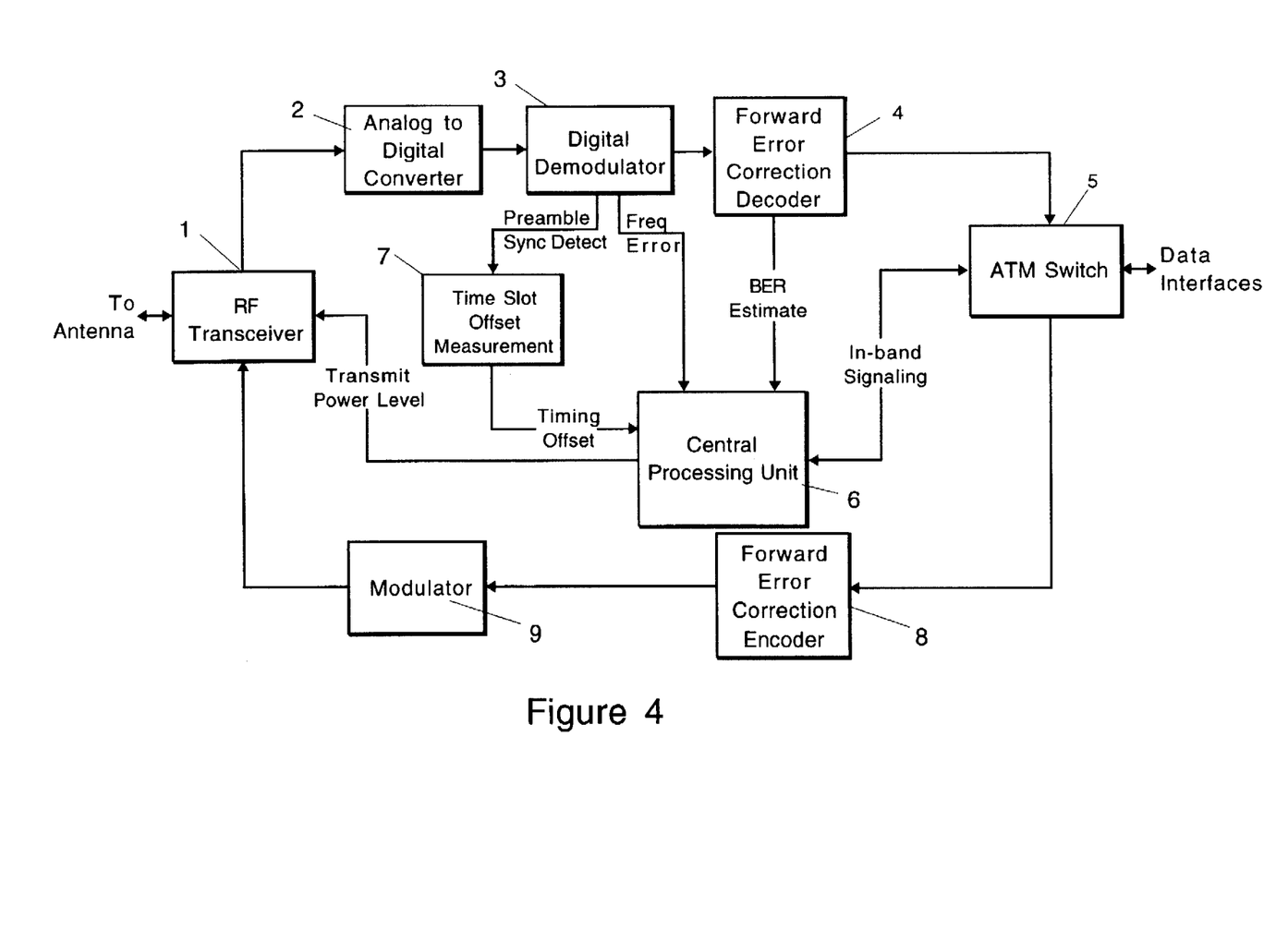
FIG. 4 is a block diagram of a base station hardware architecture.

FIG. 4 shows the block diagram for the base station equipment. An RF transceiver (1) interfaces with the antenna and performs signal amplification, downconversion form RF to baseband, and the gain control to provide proper levels into the analog to digital (A/D) converter (2). The digital demodulator (3) recovers the carrier and symbol timing of input signal and passes soft-decision demodulated data to the forward error correction decoder (4). The forward error correction decoder performs convolutional decoding via the Viterbi algorithm and Reed-Solomon decoding and passes recovered ATM cells to the ATM switch (5). In-band ATM signaling cells are passed directly to the central processing unit (6) which interprets the requests and polling responses.

When the base station polls as user for status and health, it will read the user's timing offset from the timing counter (7), and the user's frequency offset and signal level from the digital demodulator. Corrections to these are assembled into an in-band ATM cell and passed to the ATM switch for insertion into the downstream frame. Time slots in the downstream frames are filled with cells by the ATM switch according to typical scheduling functions of switches with the exception that the ATM switch inserts the frame start cell received from the central processing unit and exact intervals. The ATM cells are then forward error correction encoded (8) and modulate (9) to form the downstream RF. The RF transceiver upconverts the downstream signals to radio frequency. The central processing unit adjusts the transmit power level according to bit error rate measurements fed back from the subscriber to the hub station in the upstream network management polling response ATM cells.

VARIATIONS

The following variations should be obvious to a trained observer and are also claimed:

1. Use of alternate data rates resulting in a different number of time slots per frame.
2. Use of means other than ATM switch for routing in-band signaling ATM cells to the CPU in the base station.
3. Use of means other than SAR device for routing in-band signaling ATM cells to the CPU in the user equipment.
4. Location of the contention cells and polling response cells within the upstream frame. Depending on processing capability, it may be advantageous to place the polling response time slot in the middle of the upstream frame, so that the subscriber can respond within the same frame period.

5. Use of alternate circuits for adjusting the user transmit time slot timing with respect to implementing a network protocol for wireless broadband-ISDN. Use of alternate circuits for unrelated applications in not claimed.

6. Other measures of received power level by the user equipment such as monitoring AGC settings, bit error rates prior to forward error correction decoding, etc.

While the invention has been described in connection with preferred embodiments, it will be appreciated that various other modifications and adaptations of this invention will be obvious to those skilled in the art.

What is claimed is:

1. In a RF communication system for controlling communication between a base station and a plurality of stationary user stations, said base station and each said user stations having an RF transceivers and each said stationary users having a high gain directional antenna, the improvement comprising, in combination:

means for effecting time-division multiplexed communications from said base station to said stationary users, means for providing time division multiple access time slot communications from each said stationary user, respectively, to said base station including means for actively assigning time slots to each said user and means for synchronizing frame timing from each said user transceiver, respectively, with frame timing between said base station to said stationary users, each said time slot carries one asynchronous transfer mode (ATM) cell and wherein the first of time slots in the communication between said base station and said carries a frame start ATM cell.

2. In an RF communication system for controlling communication between a base station and a plurality of stationary user stations, said base station and each said user stations having an RF transceivers and each said stationary users having a high gain directional antenna, the improvement comprising, in combination:

means for effecting time-division multiplexed communications in the downstream direction from said base station to said stationary users, time slots in said down stream direction having one sync byte, one ATM cell, and no guard time, means for providing time division multiple access time slot communications in the upstream direction from each said stationary user, respectively, to said base station including means for actively assigning time slots to each said user and means for synchronizing frame timing from each said user transceiver, respectively, with frame timing between said base station to said stationary users, time slots in said upstream direction having two preamble bytes, one ATM cell, and one byte guard time, each said time slot being divided into asynchronous transfer mode (ATM) cells and wherein the first of time slots in the communication between said base station and said carries a frame start ATM cell.

3. The RF communication defined in claim 2 wherein the frame periods in both the upstream and downstream directions are approximately but not greater than six milliseconds in length to allow delivery of voice traffic with minimum latency.

4. The RF communication system defined in claim 2 incorporating:

a) The downstream is continuous-carrier, without pulse-shape filtering, with frequency channels symbol synchronous; and spaced $1/T_D$ apart where $T_D$ is the period of a downstream modulation symbol;

b) The upstream is burst-mode with 25% excess bandwidth root raised cosine filtered with frequency channels spaced $1.25/T_D$ apart where $T_D$ is the period of an upstream modulation symbol;

c) QPSK or alternately to QAM modulation is employed on the upstream and the downstream;

d) A concatenated (60, 54) Reed-Solomon over GF(256) and rate 7/8 convolutional code is used on the downstream and e) A (59,53) Reed-Solomon code over GF(256) is used on the upstream.

5. The RF communication system defined in claim 2 further incorporating:

Means for control plane functions through a) In-band signaling through ATM cells with reserved VPI/VCIs so that the requirements for acquisition, demodulation, and forward error correction are uniform across the data, control, and management planes of the network protocol;

b) Transmission convergence layer medium access control which actively assigns time slots in the upstream direction to accommodate varying demands for bandwidth by multiple users;

c) Contiguous time slots at the beginning of the upstream frame are used for entry into the network by users whose two-way range timing has not been resolved to avoid mutual interference, where users entering the network remain on the net entry time slots until their timing is aligned;

d) Session requests are performed on a contention basis through random access of the net entry time slots;

e) Carrying control plane acknowledgement of service requests in the payload of the frame start ATM cell in the downstream frame.

6. The RF communication system defined in claim 2 wherein there are modulation symbols in each time slot, and adjacent cells in said time slots, and further incorporating:

means for management plane functions provided through:

a) in-band signaling through ATM cells with reserved VPI/VCIs so that the requirements for acquisition, demodulation, and forward error correction are uniform across the data, control, and management planes of the network protocol;

b) polling users by the base station, with users responding on dedicated time slots in the upstream frame;

c) carrying management plane polling requests in the payload of the frame start ATM cell in the downstream frame;

d) upstream time slot synchronization is maintained to within ±2 modulation symbols through timing control to correct range difference from the base station to each user and through slaving the user transmit symbol clock to its received symbol clock;

e) upstream power control is employed to ensure adequate received signal strength at the base station while minimizing adjacent cell interference.

7. The RF communication system defined in claim 2, said base station including an ATM switching device, a central processing unit and Barker code sequences in said ATM cells, and further including:

a) means for routing of in-band signaling ATM cells by the ATM switching device to and from the central processing unit;

b) means for measuring timing offsets by subscribers through counting periods of the reference symbol clock from a master frame epoch to the detection of the Barker code sequence of the received transmission from the user;

c) means for measuring received signal level via bit error rate estimation or relative received power level for closed loop power control of the user transmitter.

8. The RF communication system defined in claim 2, said user station including ATM switching and reassembly device and user equipment central processing unit, and further including:

a) means for routing in-band signaling ATM cells to and from the ATM switching and reassembly device to the user equipment central processing unit;

b) adjusting transmitter power based on received power level and power control commands via in-band signaling ATM cells from the base station;

c) means for slaving the transmit symbol clock reference to the received symbol clock reference;

d) means for adjusting the transmit symbol clock timing to minimize interface to other users.

9. A time-division wireless two-way point to multi-point communication system including base and user stations, the base station using one frequency band and the user stations another, wherein the modulation of transmission from the base station comprises sequentially transmitted groups of digital data cells, and each such cell contains both message data and digital information directing that message data to a particular user station or stations, each data frame transmitted from a user station to the base station comprises zero or more cells of similar structure to those in base station transmissions, transmitted discontinuously and such that in regular operation, cells transmitted by a user station do not occupy the same time interval as those from other user stations, frames of cells transmitted by user stations are synchronized to the frames transmitted by the base station, so that a user to base station frame follows each base station to user frame and each base station transmitted frame begins with a unique frame start cell.

10. A communication system as described in claim 9 characterized by said frame for base station to user station and user station to base station transmissions being approximately six milliseconds in duration.

11. A communication system as described in claim 9 wherein transmissions from base to user stations employ a continuous carrier signal modulated with $\alpha=0.23$ root-raised cosine filtered digital signals, the structure of each data cell is that described in the Asynchronous Transmission Method (ATM) standard, modulation is a combination of 4-phase modulation and multilevel amplitude modulation and error correction is accomplished through concatenated forward error correction coding using a Reed-Solomon code applied to each set of four adjacent data cells.

12. A communication system as described in claim 9 wherein cell transmissions from user stations to base station employ bursts of carrier modulated with $\alpha=0.23$ root-raised cosine filtered digital signals, the structure of each data cell is that described in the Asynchronous Transmission Method (ATM) standard, modulation is quadrature-phase-shift-keyed, and error correction is accomplished through forward error correction coding using a Reed-Solomon code applied to each data cell transmitted.

13. A communication system as described in claim 9 wherein medium access control is carried out by:

transmission of access control-related information within ATM standard data cells having unique identifiers that identify the data they contain, thus enabling any cell to contain either message data or control data, access control means associated with the base station that, on the basis of requests made by user stations, dynamically assigns cells (time slots) in the user to base station transmission frames to accommodate the transmission demands of the user stations, where the cell or cells assigned to each user station are transmitted in the frame start cell of the base station's frame.

time periods at the beginning of the base to user frame sequence set aside for transmissions by user stations entering the network until they can be detected, recognized and assigned cell slots in a subsequent user to base station frame, ATM-cell time periods set aside, in user to base station frames, for use by user stations that have previously joined the network but have not recently requested to transmit data cells, where acknowledgment of service requests by user stations is made by the access control means through data within the frame start ATM cell.

14. A communication system as described in claim 9 wherein system management synchronization and transmit power control functions are carried out by transmission of system management commands or requests in base station frame start cells, each user station slaving its transmit clock to timing derived from the received, where the cell or cells assigned to each user station are transmitted in the frame start cell of the base station's frame.

time periods at the beginning of the base to user frame sequence set aside for transmissions by user stations entering the network until they can be detected, recognized and assigned cell slots in a subsequent user to base station frame, ATM-cell time periods set aside, in user to base station frames, for use by user stations that have previously joined the network but have not recently requested to transmit data cells, where acknowledgment of service requests by user stations is made by the access control means through data within the frame start ATM cell.

* * * * *